US011458635B2

(12) United States Patent
Wicks et al.

(10) Patent No.: US 11,458,635 B2
(45) Date of Patent: Oct. 4, 2022

(54) METHOD AND SYSTEM FOR MANIPULATING ARTICLES

(71) Applicants: INTELLIGRATED HEADQUARTERS, LLC, Mason, OH (US); CARNEGIE MELLON UNIVERSITY, Pittsburgh, PA (US)

(72) Inventors: Matthew R. Wicks, St. Charles, MO (US); Gabriel Goldman, Pittsburgh, PA (US); D. W. Wilson Hamilton, Bethel Park, PA (US); Katharina Muelling, Pittsburgh, PA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 444 days.

(21) Appl. No.: 16/405,074

(22) Filed: May 7, 2019

(65) Prior Publication Data
US 2019/0344448 A1 Nov. 14, 2019

Related U.S. Application Data

(60) Provisional application No. 62/669,093, filed on May 9, 2018.

(51) Int. Cl.
*B25J 9/16* (2006.01)
*B25J 15/06* (2006.01)
(Continued)

(52) U.S. Cl.
CPC .......... *B25J 9/1697* (2013.01); *B25J 9/0093* (2013.01); *B25J 15/0691* (2013.01); *B25J 19/02* (2013.01);
(Continued)

(58) Field of Classification Search
CPC .... B25J 9/1697; B25J 9/0093; B25J 15/0691; B25J 19/02; B25J 15/0675; B25J 15/00;
(Continued)

(56) References Cited

U.S. PATENT DOCUMENTS 4,390,390 A 6/1983 Margraf et al.
4,571,320 A 2/1986 Walker
(Continued)

FOREIGN PATENT DOCUMENTS

CA 2963064 C 2/2018
CN 204954848 U 1/2016
(Continued)

OTHER PUBLICATIONS

DE102007054867-Translate, Workpiece i.e. cup, gripping device, has rolling module and suction module engaged at workpiece at same time or one after other, where suction module is formed from surface suction gripper, Inventor: Schaaf Walter. (Year: 2009).*

(Continued)

*Primary Examiner* — B M M Hannan
(74) *Attorney, Agent, or Firm* — Alston & Bird LLP

(57) ABSTRACT

Various example embodiments described herein relate to an item manipulation system including a control system and a robotic arm coupled to the control system. The item manipulation system includes an end effector communicatively coupled to the control system and defines a first end and a second end. The first end of the end effector is rotatably engaged to the robotic arm. The item manipulation system also includes a gripper unit attached to the second end of the end effector. The gripper unit is configured to grip the item. The gripper unit includes at least one flexible suction cup and at least one rigid gripper. Each of the flexible suction cup and the at least one rigid gripper engage a surface of the item (Continued)

based on vacuum suction force generated through the at least one flexible suction cup or the at least one rigid gripper.

20 Claims, 9 Drawing Sheets

(51) Int. Cl.
   *B25J 9/00* (2006.01)
   *B25J 19/02* (2006.01)
   *B25J 15/00* (2006.01)
(52) U.S. Cl.
   CPC ............ *B25J 15/00* (2013.01); *B25J 15/0675* (2013.01); *B25J 15/0683* (2013.01)
(58) Field of Classification Search
   CPC .. B25J 15/0683; B25J 15/0052; B25J 19/022; B25J 15/0038; B25J 15/0616; B25J 15/0004; B25J 15/103; B25J 15/12; B25J 19/021; B25J 15/0019; B25J 15/0085; B25J 15/0206; B25J 15/0253; B25J 15/065; B25J 15/06; B65G 47/914; B65G 47/24; B65G 47/91
   USPC ........................................................ 700/245
   See application file for complete search history.

(56) References Cited

U.S. PATENT DOCUMENTS

| | | | |
|---|---|---|---|
| 4,613,942 A | 9/1986 | Chen | |
| 4,634,328 A | 1/1987 | Carrell | |
| 4,741,567 A | 5/1988 | Zimmer et al. | |
| 4,897,689 A | 1/1990 | De et al. | |
| 4,987,332 A | 1/1991 | Yamamoto et al. | |
| 5,542,729 A | 8/1996 | Ohtonen | |
| 6,015,174 A | 1/2000 | Raes et al. | |
| 6,517,130 B1* | 2/2003 | Donoso | H01L 21/6838 414/737 |
| 6,761,527 B2 | 7/2004 | Eisenzimmer et al. | |
| 7,313,464 B1* | 12/2007 | Perreault | B25J 9/1666 318/568.1 |
| 7,648,322 B2 | 1/2010 | Moncrief et al. | |
| 8,880,216 B2 | 11/2014 | Izumi et al. | |
| 9,120,635 B2 | 9/2015 | Su | |
| 9,205,558 B1* | 12/2015 | Zevenbergen | B25J 15/0052 |
| 9,492,923 B2 | 11/2016 | Wellman et al. | |
| 9,492,926 B2 | 11/2016 | Mattern et al. | |
| 9,498,887 B1 | 11/2016 | Zevenbergen et al. | |
| 9,707,682 B1 | 7/2017 | Konolige et al. | |
| 9,802,728 B1 | 10/2017 | Rodgers et al. | |
| 9,926,138 B1 | 3/2018 | Brazean et al. | |
| 9,981,382 B1 | 5/2018 | Strauss et al. | |
| 10,822,177 B2 | 11/2020 | Wicks et al. | |
| 11,318,620 B2 | 5/2022 | Wicks et al. | |
| 2004/0165980 A1* | 8/2004 | Huang | G06Q 10/043 414/799 |
| 2005/0072656 A1 | 4/2005 | Costanzo | |
| 2005/0115421 A1* | 6/2005 | Lyons | B41J 3/4073 101/42 |
| 2005/0196484 A1* | 9/2005 | Khoshnevis | B28B 1/001 425/463 |
| 2005/0246056 A1* | 11/2005 | Marks | B65G 57/245 700/213 |
| 2005/0281662 A1 | 12/2005 | Carey et al. | |
| 2009/0028676 A1 | 1/2009 | Langlot et al. | |
| 2009/0200139 A1 | 8/2009 | Kissee et al. | |
| 2009/0218193 A1 | 9/2009 | Malini | |
| 2010/0078953 A1 | 4/2010 | Ban et al. | |
| 2010/0170201 A1* | 7/2010 | Aquarius | B65B 35/56 53/443 |
| 2010/0199915 A1* | 8/2010 | Pettersson | A01J 5/0175 119/14.08 |
| 2010/0239408 A1 | 9/2010 | Becker et al. | |
| 2012/0205928 A1 | 8/2012 | La et al. | |
| 2014/0052555 A1 | 2/2014 | Macintosh | |
| 2014/0126988 A1 | 5/2014 | Qi et al. | |
| 2015/0344225 A1 | 12/2015 | Nakamura et al. | |
| 2016/0139438 A1 | 5/2016 | Jing et al. | |
| 2016/0196997 A1 | 7/2016 | White et al. | |
| 2016/0243590 A1 | 8/2016 | Crest et al. | |
| 2016/0282126 A1 | 9/2016 | Watts et al. | |
| 2017/0035017 A1* | 2/2017 | Hofman | A01J 5/007 |
| 2017/0062263 A1* | 3/2017 | Kesil | B25J 15/0616 |
| 2017/0066592 A1 | 3/2017 | Bastian et al. | |
| 2017/0165717 A1 | 6/2017 | Crest et al. | |
| 2017/0173789 A1* | 6/2017 | Kilibarda | B25J 13/085 |
| 2017/0203443 A1 | 7/2017 | Lessing et al. | |
| 2017/0225330 A1 | 8/2017 | Wagner et al. | |
| 2017/0349385 A1 | 12/2017 | Moroni et al. | |
| 2017/0369244 A1* | 12/2017 | Battles | B65G 1/137 |
| 2018/0022557 A1 | 1/2018 | Tanaka et al. | |
| 2018/0053144 A1 | 2/2018 | Wellman | |
| 2018/0264660 A1* | 9/2018 | Bergeron | G01L 5/228 |
| 2019/0061174 A1* | 2/2019 | Robinson | B25J 15/0683 |
| 2019/0070734 A1* | 3/2019 | Wertenberger | B25J 15/0616 |
| 2019/0185267 A1 | 6/2019 | Mattern et al. | |
| 2019/0228371 A1* | 7/2019 | Murphy | B25J 9/1697 |
| 2019/0277868 A1 | 9/2019 | Privat et al. | |
| 2021/0237219 A1 | 8/2021 | Baker et al. | |
| 2021/0308875 A1* | 10/2021 | Gealy | B25J 15/0683 |
| 2022/0024056 A1* | 1/2022 | Yap | B25J 15/0683 |
| 2022/0024705 A1* | 1/2022 | Geyer | B25J 15/0683 |

FOREIGN PATENT DOCUMENTS

| | | | |
|---|---|---|---|
| CN | 107444909 A | 12/2017 | |
| CN | 107745963 A | 3/2018 | |
| CN | 207273223 U | 4/2018 | |
| DE | 2357118 A1 | 5/1975 | |
| DE | 102007054867 A1 | 5/2009 | |
| DE | 102012009649 A1 | 11/2013 | |
| DE | 102017121557 B4 * | 3/2022 | ........... B21D 43/003 |
| EP | 1066587 B1 | 11/2007 | |
| EP | 2329925 A1 | 6/2011 | |
| JP | 2000-006074 A | 1/2000 | |
| JP | 2010-188465 A | 9/2010 | |
| JP | 2010-278408 A | 12/2010 | |
| JP | 2015-153837 A | 8/2015 | |
| JP | 2016-145115 A | 8/2016 | |
| JP | 2017-124469 A | 7/2017 | |
| JP | 2017170560 * | 9/2017 | .............. B25J 13/08 |
| WO | 2010/109923 A1 | 9/2010 | |
| WO | 2012/144120 A1 | 10/2012 | |
| WO | WO2014111633 A1 * | 7/2014 | .......... B25J 15/0052 |
| WO | 2016/054561 A1 | 4/2016 | |

OTHER PUBLICATIONS

WO2014111633.translate, Neveu Dominique [FR]; Laurent Pascal [FR], Title: Gripping Device and Related Method. (Year: 2014).*
Extended European Search Report for European Application No. 19173385.6 dated Sep. 27, 2019.
Office Action for European Application No. 19173385.6 dated Nov. 18, 2019.
Partial European Search Report for Application No. 19173384.9, dated Oct. 17, 2019, 15 pages.
Non-Final Rejection dated Mar. 20, 2020 for U.S. Appl. No. 16/405,041.
Extended European Search Report for Application No. 19173384.9, dated Feb. 21, 2020, 20 pages.
Comminication pursuant to Rules 70(2) and 70a(2), for European Application No. 19173384.9, dated Mar. 30, 2020.
Extended European Search Report for Application No. 19173383.1, dated Sep. 16, 2019, 10 pages.
Vacuum Suctions Cups, Vacuforce LLC, [online], [retrieved Aug. 6, 2019], retrieved from the Internet <URL: http://www.vacuforce.com/products.html> (2 pages).
Notice of Allowance and Fees Due (PTOL-85) dated Jul. 1, 2020 for U.S. Appl. No. 16/405,041.

(56) References Cited

OTHER PUBLICATIONS

Non-Final Office Action received for U.S. Appl. No. 16/405,060, dated Jul. 22, 2021, 27 pages.
Communication Pursuant to Article 94(3) issued in European Application No. 19173384.9 dated Sep. 24, 2021, 10 pages.
Notice of Allowance and Fees Due (PTOL-85) dated Nov. 19, 2021 for U.S. Appl. No. 16/405,060.

* cited by examiner

METHOD AND SYSTEM FOR MANIPULATING ARTICLES

CROSS-REFERENCE TO RELATED APPLICATIONS

This application claims the benefit of U.S. Provisional Patent Application No. 62/669,093, entitled "Method and System for Reorienting Articles," filed on May 9, 2018, the disclosure of which is hereby incorporated by reference in its entirety.

TECHNOLOGICAL FIELD

Example embodiments of the present invention relate generally to a material handling system for handling items, and, more particularly, to an item manipulation system of the material handling system for manipulating one or more items in a material handling environment.

BACKGROUND

Material handling systems can convey, sort, and organize items (e.g., cartons, cases, containers, shipment boxes, totes, packages, and/or the like) at high speeds. Depending on a configuration of the material handling system, the items may travel through the material handling systems in an unregulated manner or may be repositioned, reoriented, and/or consolidated into a single stream of items on conveyors and/or other locations. Material handling systems may rely on a conveyor controller and/or warehouse management system to organize items conveyed and/or handled.

Generally, a material handling system is required to handle items of different types and body shapes, for instance, items having a rigid body shape or a flexible body shape. For example, the material handling system may be required to handle items having a rigid body shape (e.g., totes, containers, cartons, heavy shipment boxes, and/or the like). In some cases, the material handling system handles items having flexible body shape (e.g., packages, polybags, envelopes, and/or the like). These rigid and flexible items may further need to be repositioned and/or reoriented through various stages of handling and processing by the material handling system.

Applicant has identified several technical challenges associated with handling items of different body shapes, and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented hereafter.

Various example embodiments described herein relate to methods and systems for manipulating items in a material handling environment. In some example embodiments, an item manipulation system is described. The item manipulation system comprises a control system and a robotic arm that is communicatively coupled to the control system. The item manipulation system also comprises an end effector that is communicatively coupled to the control system. The end effector defines a first end that is rotatably engaged to the robotic arm and a second end. The item manipulation system also comprises a gripper unit that is attached to the second end of the end effector. The gripper unit is configured to be actuated by the control system, so as to grip the item. The gripper unit includes at least one flexible suction cup and at least one rigid gripper. Each of the at least one suction cup and the at least one rigid gripper are configured to engage a surface of the item based on vacuum suction force generated through the at least one suction cup and the at least one rigid gripper, respectively.

In some example embodiments, the robotic arm is adapted to rotate the end effector, so as to, change an orientation of the item gripped by the gripper unit from a first orientation to a second orientation. According to some example embodiments, the gripper unit also includes, at least one ejector positioned at each of the at least one flexible suction cup and the at least one rigid gripper. The at least one ejector is adapted to eject the item gripped by the gripper unit.

In some example embodiments, the robotic arm is adapted to position the end effector, so as to pick the item positioned in a first orientation by gripping the item with the gripper unit and move the end effector in order to place the item in the second orientation.

In some example embodiments, the item manipulation system also includes at least one vacuum generator adapted to generate the vacuum suction force through the at least one flexible suction cup and the at least one rigid gripper to facilitate gripping of the item by the gripper unit.

According to some example embodiments, the item manipulation system further includes a laser range finder adapted to identify the item in the first orientation and communicate to the control system at least one of a picking position, a gripping position, a retrieval position, or a discharging position of the end effector based on the identified first orientation.

In accordance with some example embodiments described herein, the end effector of the item manipulation system comprises a roller gripper unit having a first roller and a second roller. The roller gripper unit is adapted to rotate the first roller in a first direction and rotate the second roller in a second direction opposite to the first direction so as to pinch at least a portion of a second item between the first roller and the second roller and rotate the first roller and the second roller in a release direction of the second item so as to release the portion of the second item.

In some example embodiments, the item manipulation system comprises an adapter unit configured to rotatably engage one end of the robotic arm to the first end of the end effector. The adapter unit includes at least one sensor configured to generate sensor data corresponding to at least one of a weight distribution of the item or a center of gravity of the item and process the sensor data in order to identify a vacuum suction force to be generated by a vacuum generator of the end effector.

According to some example embodiments, an end effector is described. The end effector defines a first end configured to be rotatably engaged to an end of a robotic tool and a second end comprising a rigid gripper and a flexible suction cup. Each of the rigid gripper and the flexible suction cup may be configured to engage a surface of an item based on vacuum suction force generated by at least one vacuum generator, through the rigid gripper or the flexible suction cup. In accordance with said example embodiments, the end effector is adapted to rotate about an axis to change an orientation of the item engaged at the second end from a first orientation to a second orientation.

In accordance with some example embodiments, the end effector includes a laser range finder adapted to identify an orientation of the item. The end effector may be further configured to move to one of a picking position, a gripping position, a retrieval position, or a discharging position based on the identified orientation of the item.

According to some example embodiments, the end effector is moved to the gripping position to grip the item and further rotated to change the orientation of the item from a first orientation to a second orientation.

In some example embodiments, the end effector includes a roller gripper unit having a first roller and a second roller. The roller gripper unit is adapted to rotate the first roller in a first direction and rotate the second roller in a second direction opposite to the first direction so as to pinch at least a portion of a second item between the first roller and the second roller and rotate the first roller and the second roller in a release direction of the second item so as to release the portion of the second item.

According to some example embodiments, the end effector includes an adaptor unit configured to rotatably engage with the end of the robotic tool. The adaptor unit includes at least one sensor configured to generate sensor data corresponding to at least one of a weight distribution of the item or a center of gravity of the item and process the sensor data in order to identify a vacuum suction force to be generated by a vacuum generator of the end effector.

According to some example embodiments, the second end of the end effector includes at least four flexible suction cups positioned at each corner of a bottom surface of the end effector and the rigid gripper positioned at a center of the bottom surface of the end effector.

In some example embodiments, the end effector includes at least one ejector at each of the flexible suction cup and the rigid gripper. The at least one ejector may be adapted to eject the item gripped by the end effector.

According to some example embodiments, a method for manipulating an item is described. The method includes identifying the item to be positioned in a first orientation. The method further includes positioning an end effector to pick the item in the first orientation. Upon positioning the end effector, the method includes engaging a surface of the item by at least one of a flexible suction cup or a rigid gripper of the end effector. Further, the method includes rotating the end effector to change an orientation of the item engaged to the end effector from the first orientation to a second orientation.

In some example embodiments, the method includes moving the end effector to a first position to position the end effector to pick the item in the first orientation and moving the end effector to a second position to position the end effector to place the item in the second orientation. Further, the method includes ejecting, by ejectors of the flexible suction cup and the rigid gripper, respectively, the item gripped by the end effector.

According to some example embodiments, the method of manipulating the item also includes generating sensor data corresponding to at least one of a weight distribution of the item or a center of gravity of the item. Further, the method includes processing the sensor data to identify a vacuum suction force to be generated by a vacuum generator of the end effector through each of the flexible suction cup and the rigid gripper.

According to some example embodiments, the method of manipulating the item includes identifying, by a laser range finder of the end effector, an orientation of the item. Further, the method includes communicating to a control system of the end effector at least one of a picking position, a gripping position, a retrieval position, or a discharging position of the end effector based on the identified orientation of the item.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
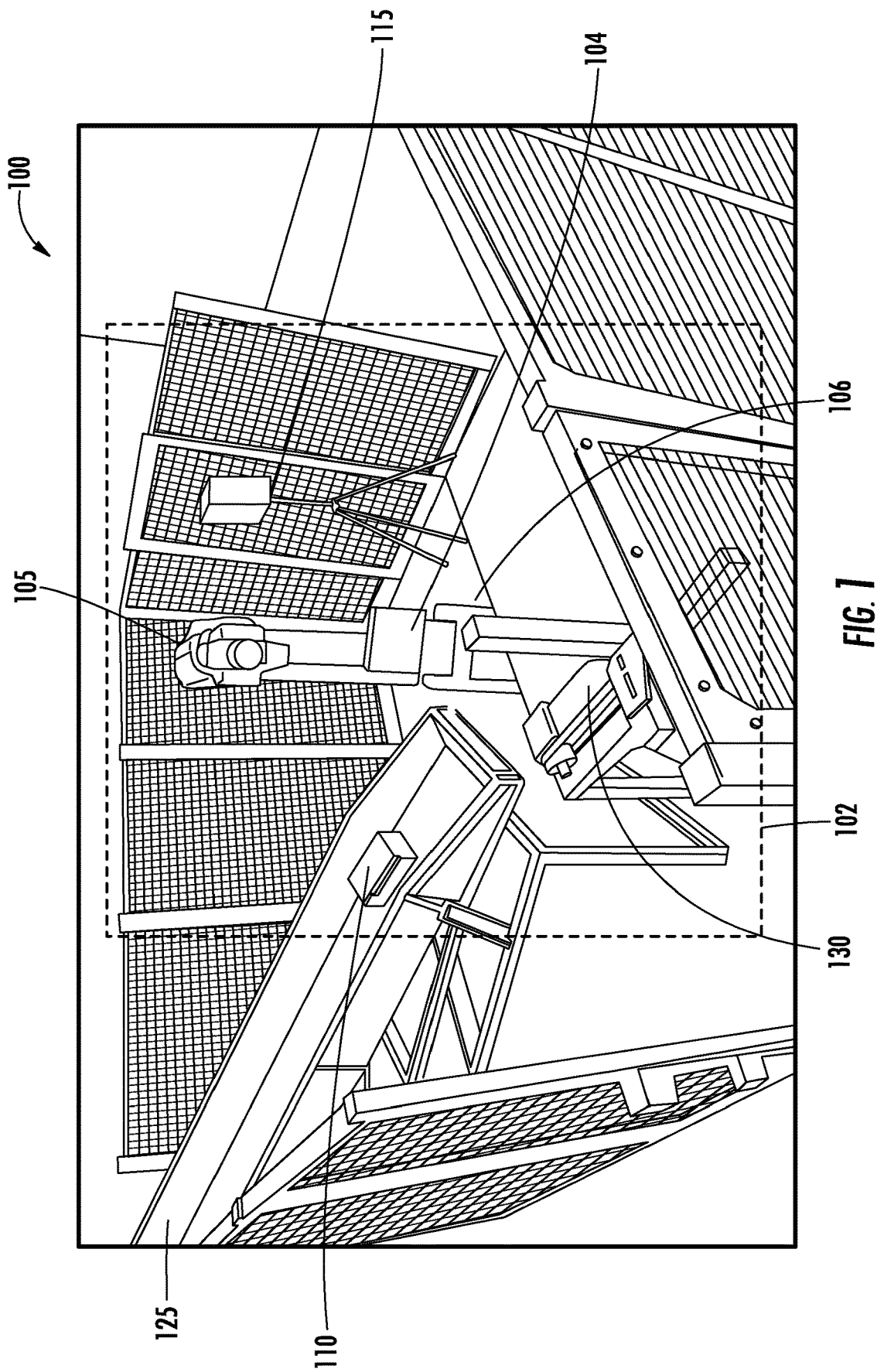
FIG. 1 illustrates a perspective view of a material handling system including an item manipulation system, in accordance with some example embodiments described herein.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

In material handling environments, such as distribution centers, warehouses, inventories, or shipping centers, various equipment such as robotic arms, item manipulators, conveyor overhead units, and/or the like are used for performing various operations. For instance, this equipment is used for manipulating items located in the material handling environment and/or in transit on conveyors. Manipulation of the items may involve performing operations such as picking, re-orienting, placing, stacking, un-stacking, lifting, repositioning, or relocating the items.

Generally, a material handling system may include robotic tools installed in the material handling environment that are configured to perform the manipulation of items. These robotic tools are usually designed to pick an item of a particular body shape.

Manipulating an item, in some cases, requires changing an orientation of the item. For example, it is required to reposition the item so as to expose a label of the item in a correct orientation in a field of view of a sensing system. The labels may be associated to these items. For instance, some items may include a label including indicia or coded information (e.g., barcodes, QR codes, DPM codes and/or the like) that are scanned and decoded by an operator or a scanning system (e.g., a bi-optic scanner installed over a conveyor) for uniquely identifying the items and retrieving information associated with the items. In some other cases, manipulating the items requires changing an orientation of the items so as to stack a number of items in an order (e.g., stacking pallets).

Thus, it is desired to handle different types of items (i.e., different body shapes) at a faster rate including re-orientating the items such as when these items are inducted onto a sortation conveyor or a downstream conveyor and/or are handled by equipment like robotic tools, sorters, or end effectors. Manually changing the orientation of each item on the conveyor is time-consuming and causes loss of overall productivity of operators. Also, switching between robotic tools having different configurations of end effectors customized to handle items of different body shapes is ineffective. Still further, each such robotic tool may require a larger footprint and occupy extra space within the material handling environment. Each of these disadvantages add to the overall cost and slows down operations within the material handling environment, thereby impacting an overall throughput of the material handling system.

Various example embodiments described herein relate to an item manipulation system having an end effector configured to handle items of different body shapes (e.g., flexible body shape items, thin body shape items, rigid body shape items, and/or the like). Further, the item manipulation system is configured to manipulate an item from a first orientation to a second orientation. An example item manipulation system includes a robotic arm communicatively coupled to a control system and an end effector. The end effector defines a first end rotatably engaged to the robotic arm and a second attached to a gripper unit. The gripper unit is configured to be actuated by the control system and includes at least one flexible suction cup and at least one rigid gripper. In this regard, depending on a body shape of the item, at least one of: the at least one flexible suction cup and the at least one rigid gripper are configured to engage a surface of the item based on vacuum suction force. In accordance with said example embodiments, to grip a flexible item (i.e., an item having a flexible body shape), the control system may actuate the gripper unit to cause engagement of the at least one flexible suction cup with a surface of the flexible item based on a first vacuum suction force generated through the at least one flexible suction cup. Similarly, in some example embodiments, to grip a rigid item (i.e., an item having a rigid body shape) the control system of the item manipulation system may actuate the gripper unit to cause engagement of the at least one rigid gripper with a surface of the rigid item based on a second vacuum suction force generated through the at least one rigid gripper.

According to some example embodiments, the robotic arm is also adapted to rotate the end effector so as to change an orientation of the item gripped by the gripper unit from a first orientation to a second orientation. For instance, the robotic arm positions the end effector so as to pick the item positioned in a first orientation by gripping the item with the gripper unit and move the end effector in order to place the item in a second orientation. Thus, the item manipulation system described herein provides an effective handling of items of different body shapes without a requirement of switching between multiple robotic tools.

The item manipulation system described herein may be positioned adjacent to or in a proximity to a downstream conveyor such that the items of different body shapes on the conveyor that are identified to be manipulated or re-oriented may be manipulated irrespective of its body shape. In this aspect, depending on a body shape of the item, a material handling procedure of the end effector of a robotic tool may be selected. By way of example, a first material handling procedure may cause gripping the item based on at least one flexible suction cup, while a second material handling procedure may cause gripping the item based on the at least one rigid gripper. Similarly, a third material handling procedure for the end effector may cause gripping the item by both of the at least one flexible suction cup and the at least one rigid gripper. Thus, items of different body shape can be handled by one robotic tool of the item manipulation system and further manipulated from a first orientation to a second orientation, without disrupting ongoing operations of the material handling system.

Having described an example embodiment at a high level, the design of the various devices performing various example operations is provided below.

Figure 2:
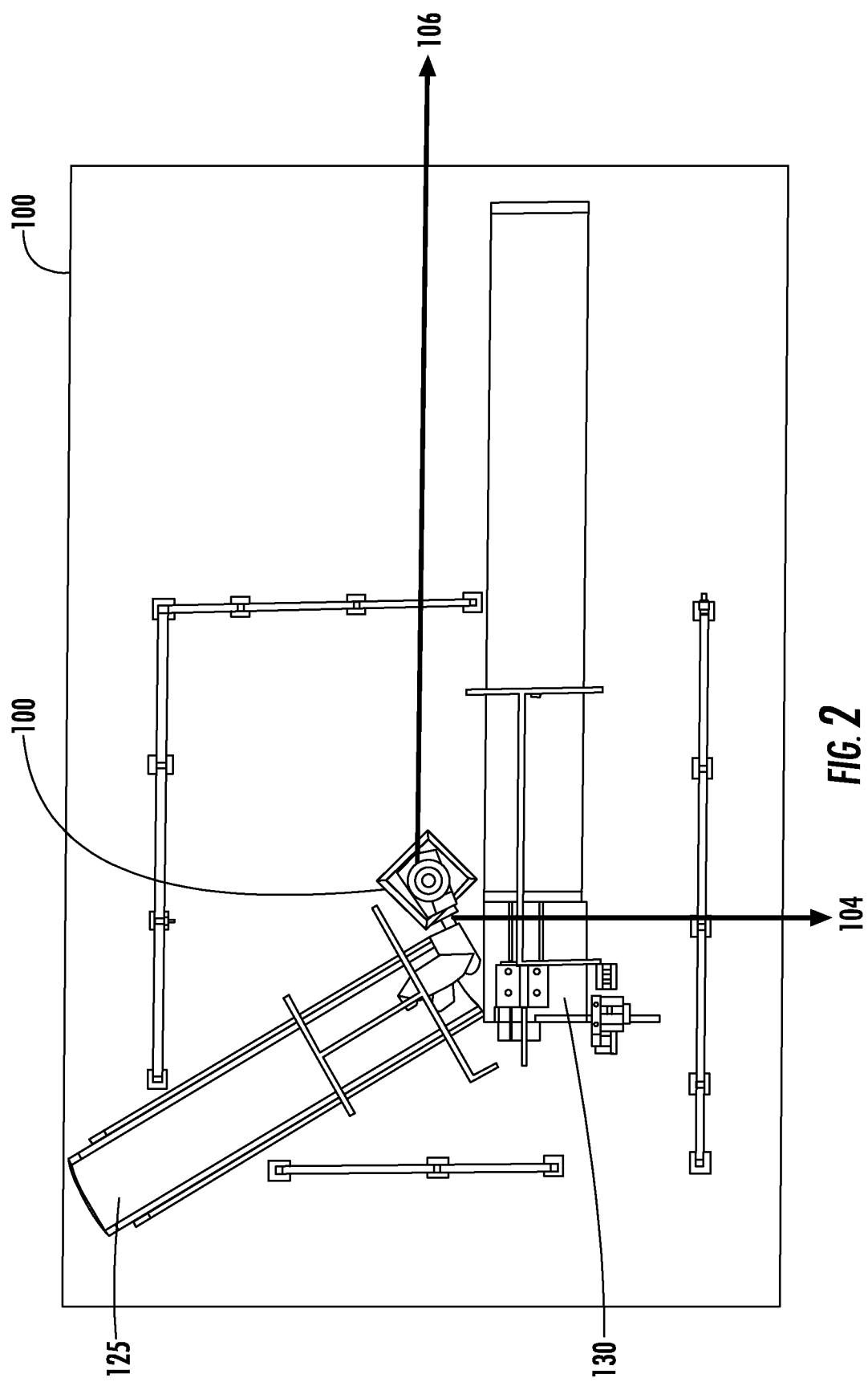
FIG. 2 illustrates a top view of the material handling system including the item manipulation system of FIG. 1, in accordance with some example embodiments described herein.

FIG. 1 illustrates a perspective view and FIG. 2 illustrates a top view of a material handling system 100 comprising an item manipulation system 102. The material handling system 100 may handle items of various body shapes, for instance, rigid body shaped items, thin body shaped items, flexible body shaped items, and/or the like. The material handling system 100 may include a variety of components and/or subsystems, such as an induction conveyor, sortation system, chutes, identification systems, vision systems, robotic subsystems, and the like, for handling and processing items.

In accordance with some example embodiments, the material handling system 100 includes the item manipulation system 102 configured to manipulate an item 110 from a first orientation to a second orientation. The item manipulation system 102 includes a robotic tool, such as a repositioning system 105, for handling and repositioning items of different body shapes. For example, the reposition system 105 may be configured to receive the item 110 in a first orientation from a chute 125 and/or a conveyor (not shown), and further reorient and/or reposition the item 110 to a second orientation for placement onto a conveyor and/or any downstream subsystem of the material handling system 100. The item manipulation system 102 also includes equipment such as a control system (not shown). The repositioning system 105 comprises a robotic arm 104 and an end effector 106 for manipulating the item 110. The end effector 106, described in accordance with various example embodiments herein, may define two ends, a first end engaged mechanically with the robotic arm 104 and a second end defining a gripper unit (not shown) for gripping items of different body shapes. Further details of the end effector 106 and the gripper unit are described hereafter with reference to FIGS. 3a-5c.

In some example embodiments, the material handling system 100 also includes a vision system 115 having one or more sensors positioned at locations within the material handling system 100. The vision system 115 may be configured to generate inputs corresponding to one or more characteristics of the item 110. It should be noted that the vision system 115 is shown as a standalone camera in FIG. 1; however, the vision system 115 is not limited to the implementation shown in FIG. 1. The vision system 115 may also include a network of imagers, sensors, cameras, identification systems, and the like for determining characteristics of one or more items in the material handling system 100. In accordance with the embodiments of the present disclosure, the characteristics of the item 110 may include a size, weight, position, edge detection, marker detection, label detection, and/or the like.

According to some example embodiments, the characteristics of the item 110 may be used to control and operate one or more subsystems (e.g., the repositioning system 105, the control system (not shown), the robotic arm 104, and/or the end effector 106) of the material handling system 100. In accordance with said example embodiments, the control system may include a controller (not shown) in communication with the equipment in the material handling system 100 (e.g., the repositioning system 105, the robotic arm 104, the end effector 106, and/or the vision system 115). The controller may include at least one processor that may execute instructions to cause the item manipulation system to perform specific operations.

In accordance with the embodiments of the present disclosure, the processor may execute instructions to cause the vision system 115 to determine a first orientation of the item 110 to be conveyed. The processor may further execute instructions to cause the repositioning system 105 to receive, via the end effector 106, the item 110 in the first orientation and manipulate the item 110 from the first orientation to the second orientation. Further, the processor may execute instructions to cause the repositioning system 105 to move the robotic arm 104, to reposition the item 110 in the second orientation for placement onto a conveyor 130, such as a downstream conveyor within the material handling system 100.

In accordance with some example embodiments described herein, the item 110, such as a parcel, may have a label placed on the item 110. The label may include an identifier comprising information corresponding to the item (e.g., items within, size, weight, delivery address, and/or the like for the parcel). In some example embodiments, the information corresponding to the item 110 may be coded in an identifier (e.g., a barcode, a QR code, a direct part marking code, and/or the like) associated with the item 110. Thus, for handling and processing the item 110, one or more subsystems of the material handling system 100 (e.g., a scanning system having an imaging device, a camera, indicia scanner, bi-optic scanner, and/or the like) may scan the identifier at different stages of conveyance. During conveyance, an orientation of the item 110 may change frequently. Thus, the item 110 may be orientated such that the label may not be positioned in an optimal label orientation for viewing by the scanning system. In such scenarios, upon identification of an orientation of the item 110, the item manipulation system 102 may cause manipulation of the item 110 from the first orientation to a second orientation that is different from the first orientation. For example, the robotic arm 104 of the item manipulation system 102 may move the end effector 106 so as to manipulate the item 110 gripped by the end effector 106 from the first orientation to the optimal label orientation. The optical label orientation, may correspond to an upright orientation of the label in which an indicia of the label positioned on a top face of the item 110 is oriented substantially upright for scanning by the scanning system. In other words, in the second orientation the label of the item 110 may correspond to an orientation such that an identifier on the label can be successfully scanned by the scanning system and decoded by the control system.

Alternatively, the item 110 may be oriented such that the label is already positioned in the optimal label orientation (e.g., in a field of view of the vision system 115 or the scanning system). In such cases, the controller may cause the item manipulation system 102 and/or any other subsystem of the material handling system 100 to transfer the item 110 to the conveyor 130 in the first orientation (i.e., without reorienting the item 110).

As described above, the repositioning system 105 may include at least one of a robotic tool that includes the robotic arm 104 and the end effector 106. In accordance with various example embodiments, the end effector comprises a gripping unit having at least one flexible suction cup and at least one rigid gripper for handling items of different body types and/or reorienting the item 110. The robotic arm 104, the end effector 106, and their associated operations are explained hereinafter in further details with reference to FIGS. 3a-5c.

FIGS. 3a to 3e illustrate multiple perspective views of a robotic tool 300 of the item manipulation system 102, as shown in FIGS. 1 and 2, in accordance with some example embodiments described herein. The robotic tool 300 includes a robotic arm portion 305 and the end effector 106. The robotic arm 104 may be any suitable robotic arm that is adapted to have a sufficient degree of motion desired for picking, placing, repositioning, re-orienting and/or perform any such type of manipulation of the item 110 and/or a group of items. In some examples, the robotic arm portion 305 may correspond to an extension of the robotic arm 104, as described in FIGS. 1 and 2.

According to various example embodiments described herein, the robotic arm portion 305 is communicatively coupled to the control system that controls operations such as movement, positioning, starting, and stopping, of the robotic arm portion 305. The control system of the item manipulation system 102 may initiate movement of the robotic arm portion 305 so as to position the end effector 106 to any of a picking position, gripping position, retrieval position, or a discharging position of the item 110, details of which are described hereafter. In some alternate example embodiments, the robotic tool 300 including the robotic arm portion 305 and the end effector 106 may be controlled by a controller remotely positioned and/or any other subsystem of the material handling system 100 to pick the item 110 in a first orientation and reorient the item 110 to a second orientation for placement onto the conveyor 130.

As shown, the robotic arm portion 305 defines at least two ends, for instance, a proximal end 352 and a distal end 354. In some example embodiments, the proximal end 352 of the robotic arm portion 305 is adapted to mechanically engage with the robotic arm 104 of the repositioning system 105. Further, the distal end 354 of the robotic arm portion 305 is rotatably engaged to a mount 330. In accordance with some example embodiments, the robotic arm portion 305 may be pivotably or rotatably attached to the robotic arm 104 so as to facilitate movement of the robotic arm portion 305 to position the end effector 106 to pick items of different body shapes.

Further, the end effector 106 of the item manipulation system 102 defines two ends (e.g., a first end 356 and a second end 358). The first end 356 of the end effector 106 is rotatably engaged to the robotic arm portion 305 through the mount 330. The second end 358 of the end effector 106 includes a gripper unit 360 comprising at least one flexible suction cup 362 and at least one rigid gripper 364. In accordance with various example embodiments described herein, the end effector 106 may include different configurations of gripping mechanisms suitable for engaging items of different body shapes. Some example gripping mechanisms of end effectors include vacuum based gripper, claw based item manipulator, finger based item manipulator, plate based item manipulator, and/or the like, that are configured for picking, engaging, and/or handling the item 110.

Figure 3A:
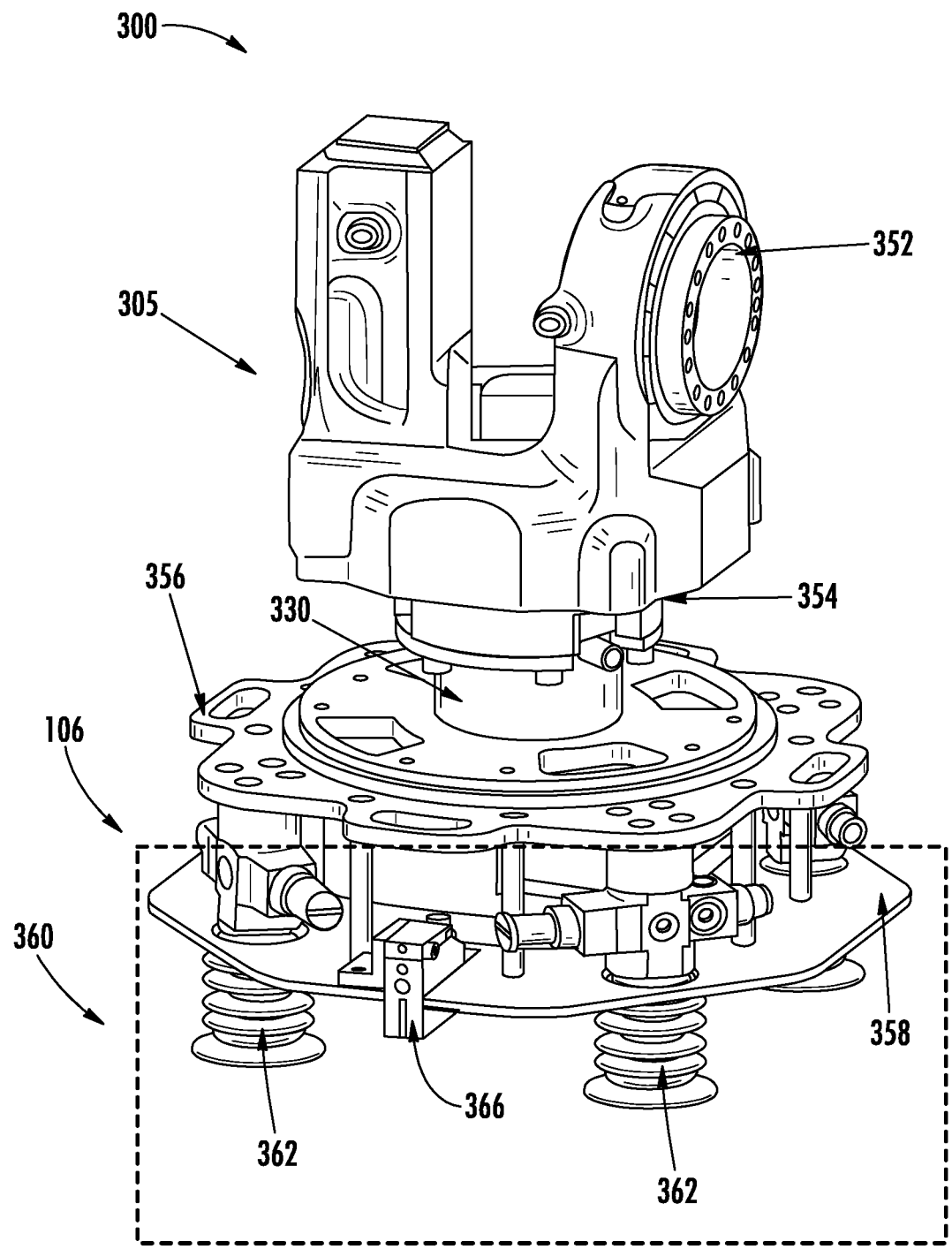
FIGS. 3a-3e illustrate different views of the item manipulation system comprising a robotic tool and an end effector, in accordance with some example embodiments described herein.
Figure 3B:
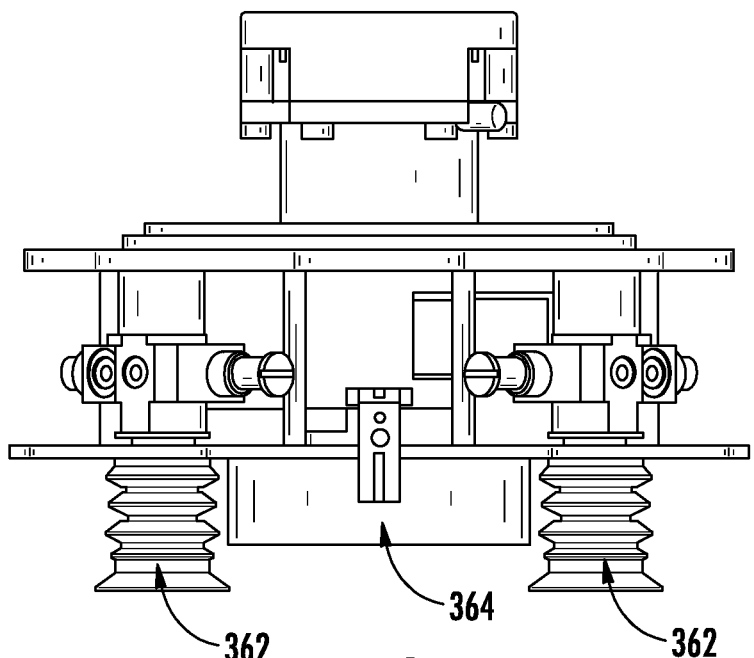
Figure 3C:
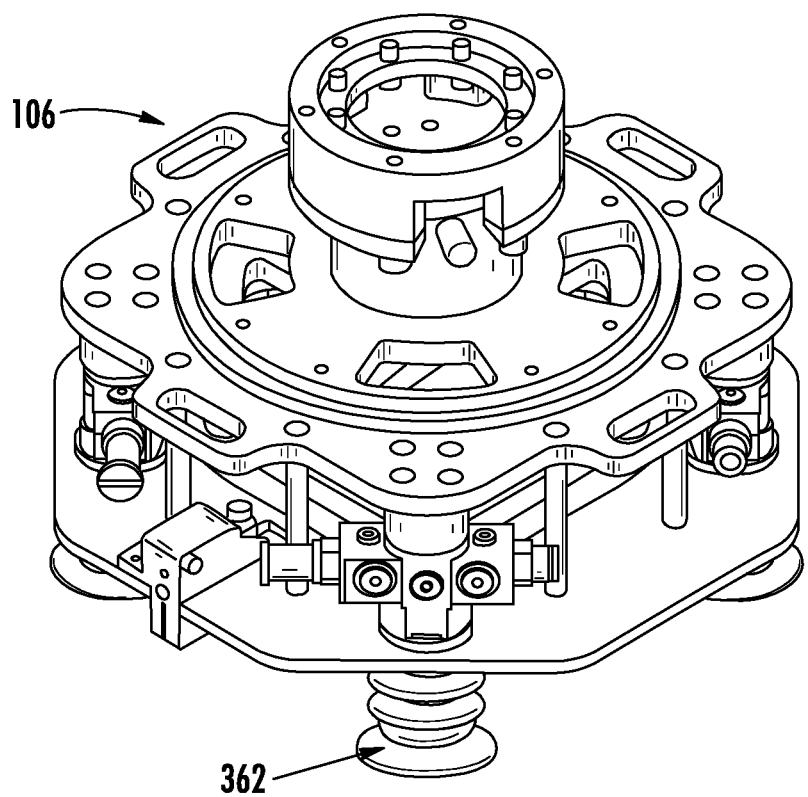
Figure 3D:
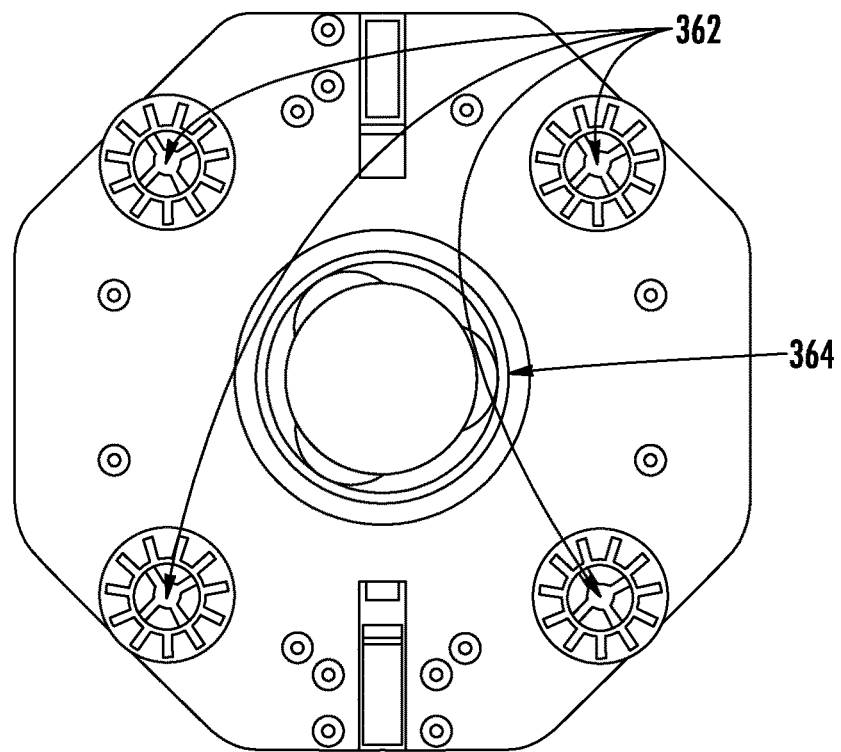
Figure 3E:
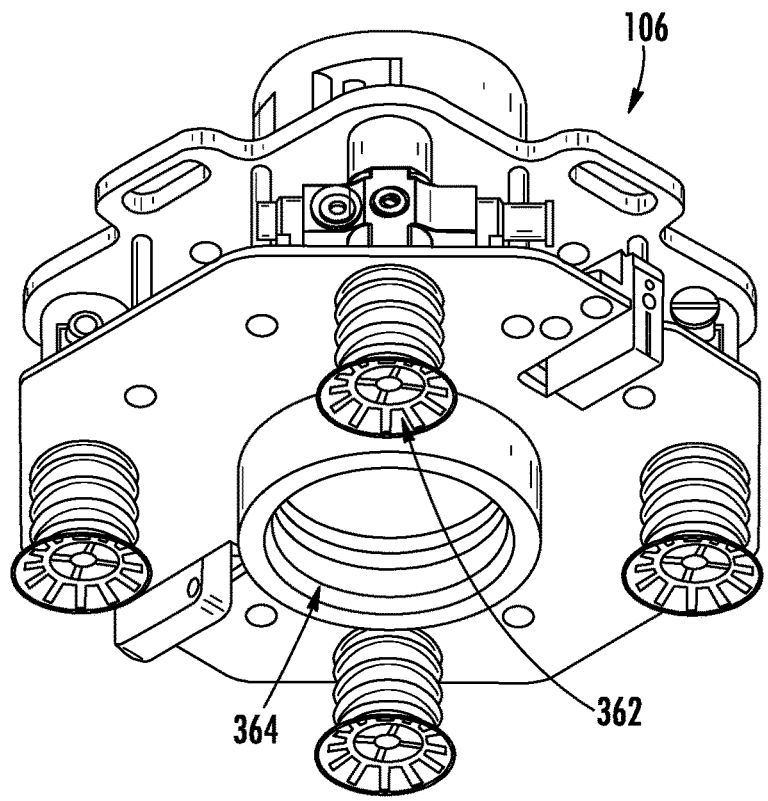

Referring to FIGS. 3d and 3e, in some examples, the end effector 106 may define at its second end 358, a configuration of the gripper unit 360 having four flexible suction cups (e.g., 362-1, 362-2, 362-3, and 362-4), positioned at a respective corners defined by a bottom surface of the gripper unit 360 and one rigid gripper 364 positioned at a center of the bottom surface of the gripper unit 360. In an alternate embodiment, the end effector 106 may include another configuration of the gripper unit 360 having six flexible suction cups (e.g., 362-1, 362-2, 362-3 . . . and 362-6) and two rigid grippers (e.g., 364-1 and 364-2) disposed on the bottom surface of the gripper unit 360. Accordingly, the end effector 106 may be engaged to different configurations of gripper units (e.g., the gripper unit 360) having a varying number of flexible suction cups and/or rigid grippers to engage items of different body shapes and different characteristics (e.g., weight, center of gravity, etc.). In this way, items are not mishandled or dropped during a movement of the end effector 106 and/or re-orientation of the items as the items are being handled.

According to some example embodiments, the at least one suction cup 362 and the at least one rigid gripper 364 of the gripper unit 360 are configured to engage a surface of the item 110 based on a first vacuum suction force generated through the at least one flexible suction cup 362 and/or a second vacuum suction force generated through the at least one rigid gripper 364. In some examples, the at least one flexible suction cup 362 may be actuated to engage items having flexible body shape (e.g., parcels, polybags, paper bags, envelops and/or the like). In some examples, the at least one rigid gripper 364 may be actuated to grip items having rigid body shapes (e.g., boxes, cartons, containers, totes, and/or the like). Based on the body shape of the item 110 handled by the item manipulation system 102, varying amounts of suction forces (e.g., vacuum suction forces) may be generated through respective flexible suction cup(s) 362 and/or the rigid gripper(s) 364.

The robotic tool 300 includes one or more vacuum sources or a vacuum generator (not shown) for creating a vacuum suction force within the at least one flexible suction cup 362 and the at least one rigid gripper 364. Each of the at least one flexible suction cups 362 and the at least one rigid gripper 364 may be in fluid communication with the one or more vacuum generators (e.g., via a plenum or one or more vacuum rods (not shown)). In operation, the one or more vacuum generators may draw vacuum suction force through the at least one flexible suction cup 362 and the at least one rigid gripper 364. Operations of the one or more vacuum generators including an amount of vacuum suction force required to be generated may be controlled by the control system. Further, the vacuum suction force through each of the at least one flexible suction cup 362 and the at least one rigid gripper 364 may be generated also based on various characteristics of the item 110 (e.g., weight, center of gravity, texture, etc.) identified by the control system.

In or more embodiments of the present disclosure, the robotic tool 300 may further include one or more sensors (e.g., a force sensor, a torque sensor, and/or a distance sensor) to measure characteristics of the item 110 (e.g., weight, position, orientation, center of gravity, size etc.). Thus, the position, size, and/or weight of the item 110 may be determined by the robotic tool 300 or any other subsystem of the material handling system 100.

According to various example embodiments, an engagement of the item 110 by the gripper unit 360 enables the end effector 106 to pick, reorient, reposition, and/or place the item 110 as needed. As described above, the end effector 106 may be mechanically attached to the robotic arm portion 305 through the mount 330 such that the end effector 106 may be capable of rotating with respect to the robotic arm portion 305. For rotating an item 110, the end effector 106 of the item manipulation system 102 may contact the item 110 positioned in a first orientation.

Further, in some example embodiments, the control system and/or any other subsystem of the material handling system 100 may determine, via the vision system 115, that the item 110 is to be manipulated from the first orientation to a second orientation. For example, the control system may determine a need of reorienting the item 110 before placing the item 110 onto a downstream conveyor and/or section of the material handling system 100. As an example, a label and/or a marker placed on the item 110 may be upside down, the item 110 may have a longer edge that may jam in the downstream conveyor, or the item 110 may need to be oriented in a specific orientation to fit a palletizing pattern. Upon determining that the item 110 needs to be reoriented, the end effector 106 may be controlled to rotate about the mount 330 in order to change the position and/or the orientation of the item 110. In some embodiments, the end effector 106 may be rotated in a clockwise direction to rotate the item 110 within a range from about 0 degrees to about 180 degrees to align a label placed on the item 110 for scanning. Further, once the item 110 is reoriented, the robotic arm portion 305 may be moved to position the end effector 106 at a position so as to place the item 110 on the conveyor 130. Furthermore, one or more ejectors of the gripper unit 360 may be actuated for respective flexible suction cups 362 and/or the rigid gripper 364 for releasing the item 110 onto the conveyor 130 in the second orientation.

According to various example embodiments described herein, the gripper unit 360 of the end effector 106 includes at least one ejector (not shown) positioned at each of the at least one flexible suction cup 362 and the at least one rigid gripper 364. The at least one ejector is adapted to eject the item gripped by the gripper unit. In an embodiment, the ejector may receive compressed air fed into the flexible suction cups 362 and the rigid gripper 364. It should be noted that the robotic tool 300 may reorient the item 110 in-hand while holding the item 110, or may reorient the item 110 in one or more steps while picking and/or placing the item 110. Details of steps performed for the manipulation of the item 110 from the first orientation to the second orientation are described hereafter in reference with FIG. 6.

According to some example embodiments described herein, the end effector 106 includes at least one laser range finder 366. The at least one laser range finder is disposed on the second end 358 of the end effector 106. The at least one laser range finder 366 is configured to identify (e.g., periodically or continuously over a period of time), the item 110 positioned in the first orientation. The laser range finder 366 is also configured to determine a distance at which the item 110 is positioned relative to the gripper unit 360. For example, the laser range finder 366 may determine the distance between a top surface of the item 110 and an end of the gripper unit 360 (e.g., between at least one flexible suction cup 362 and/or the at least one rigid gripper 364). Based on the determined distance, the control system may cause the robotic arm portion 305 to position the end effector 106 into different operating positions. In some example embodiments, based on the determined distance communicated to the control system, the end effector 106 may be moved into at least one of: (a) the picking position to pick the item 110 in the first orientation, (b) the gripping position in which the at least one flexible suction cup 362 and/or the at least one rigid gripper 364 can be selectively actuated to grip the item 110, (c) the retrieval position in which the end effector 106 is moved to retrieve the item 110 from amongst multiple items on a conveyor, and (d) the discharging position, in which the end effector 106 is moved to place the item 110 in the second orientation by ejecting the item 110 engaged to the end effector 106 based on ejectors of respective of the at least one flexible suction cup 362 and/or the rigid gripper 364. In accordance with some example embodiments herein, the laser range finder 366 may include a light source configured to emit a laser beam or light rays, and trace a time of flight of the emitted light to bounce back from the item 110 and to the laser range finder 366.

Figure 4:
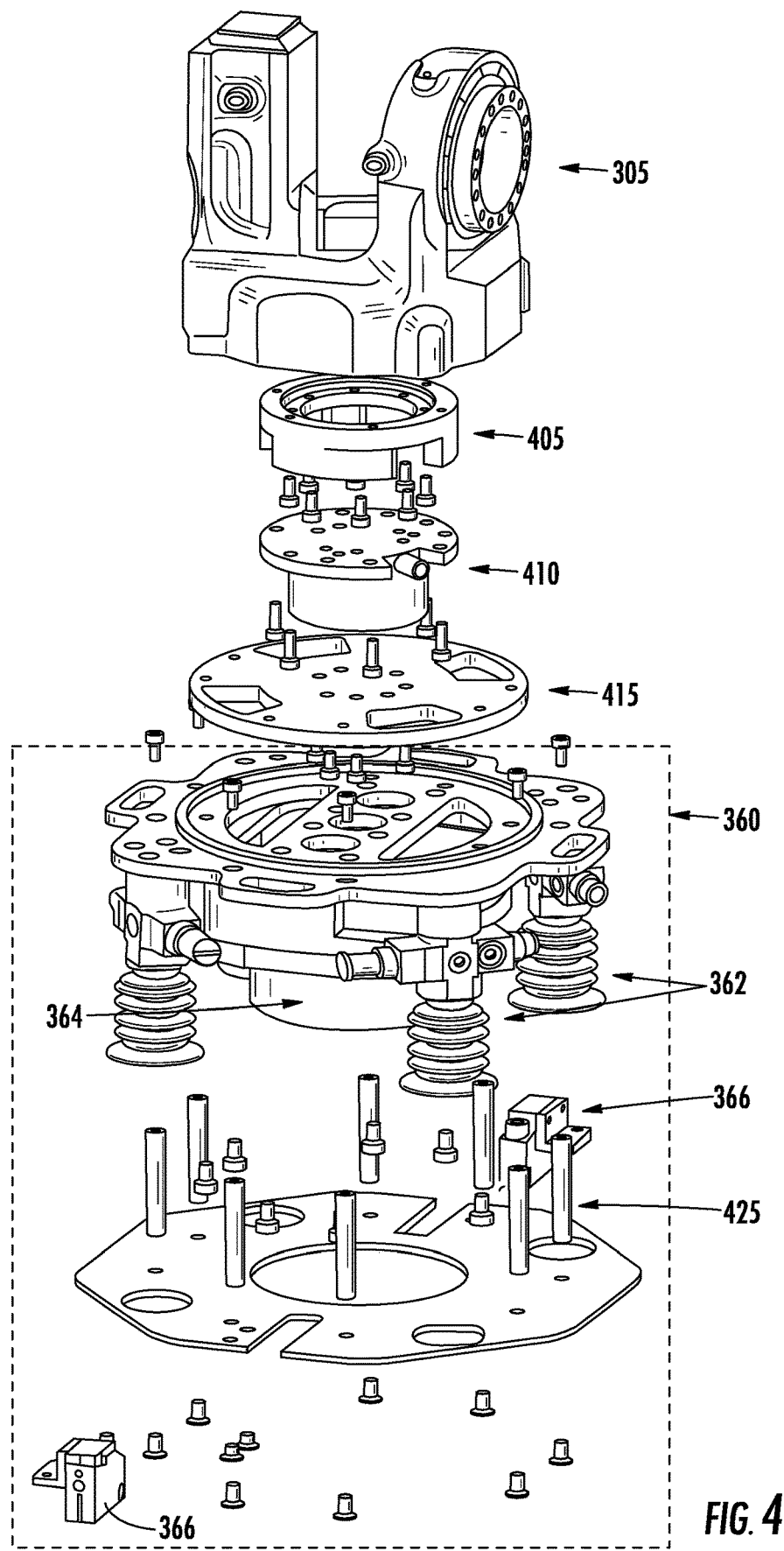
FIG. 4 illustrates an exploded view of the end effector of the item manipulation system, in accordance with some example embodiments described herein.

FIG. 4 illustrates an exploded view of the robotic tool 300, in accordance with an embodiment of the present disclosure. The robotic tool 300 includes a robotic arm portion 305 adapted to be mechanically attached to a robot flange adapter 405. The robot flange adapter 405 may include and/or be attached to at least one sensor 410 mounted on a sensor mounting flange 415. In an embodiment, the at least one sensor 410 may include a plurality of sensors (e.g., a force sensor, torque sensor, distance sensor, and/or the like) to measure different characteristics of the item 110. In an embodiment, the sensor 410 may determine, for example, a weight distribution and/or center of gravity of the item 110 and generate sensor data. Based on processing the sensor data generated by the sensor 410, the control system may cause the vacuum generators to control generation of the vacuum suction force through each of the at least one flexible suction cup 362 and the rigid gripper 364. The sensor mounting flange 415 is further attached to the end effector 106. The end effector 106 includes a dust plate 425 at the bottom of the end effector 106, as shown in FIG. 4. In an embodiment, the robotic tool 300 further includes two laser range finders (e.g., a first laser range finder 366-1 and a second laser range finder 366-2) similar to the at least one laser range finder 366 described with reference to FIGS. 3a-3e.

Figure 5A:
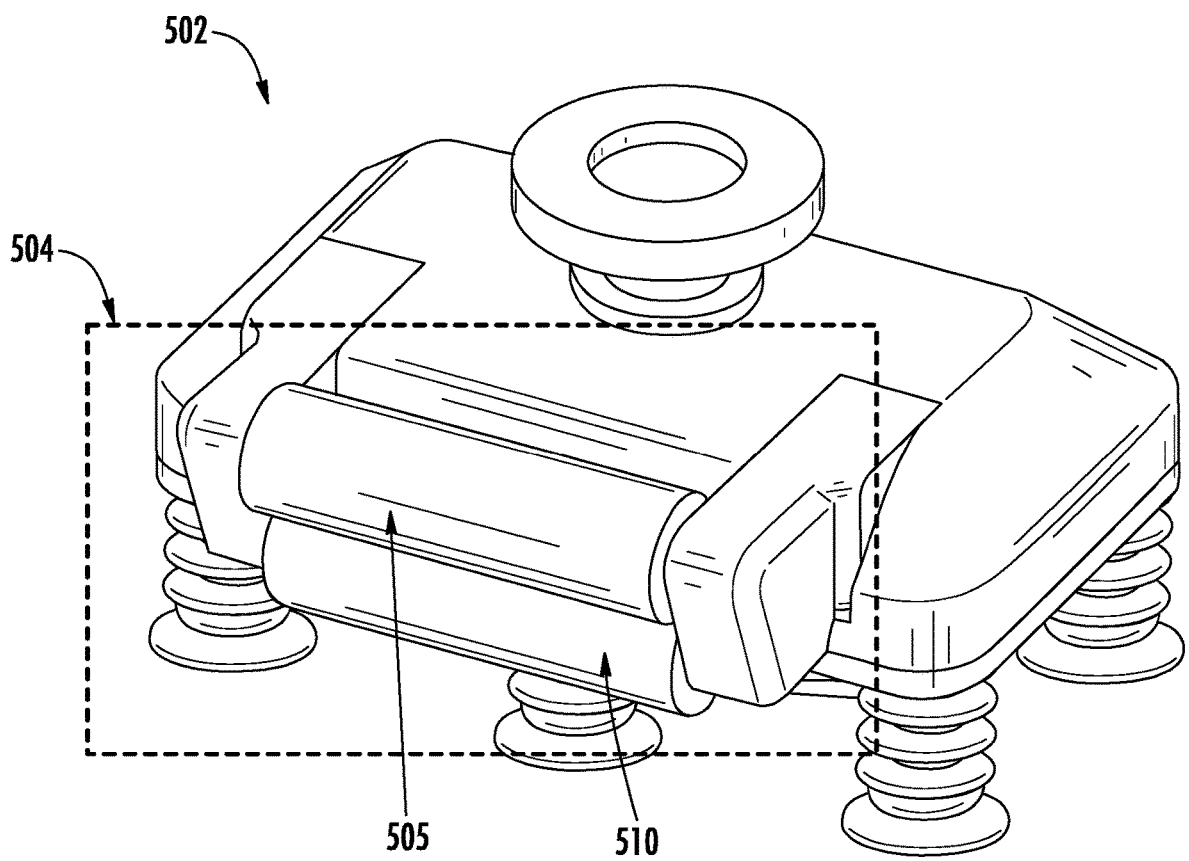
FIG. 5a illustrates a perspective view of another end effector of the item manipulation system, in accordance with some example embodiments described herein.

FIG. 5a illustrates a top view of another end effector 502 (similar to the end effector 106) of the item manipulation system 102, in accordance with some example embodiments described herein. As shown, the end effector 502 includes a roller gripper unit 504 along with the at least one flexible suction cup 362 and the at least one rigid gripper 364, as described with reference to FIGS. 3a-3e. The roller gripper unit 504, is configured for gripping items having a thin body shape (e.g., polybags, envelops, paper bags, and/or the like). In accordance with said example embodiments, the roller gripper unit 504 includes at least two rollers (e.g., a first roller 505 and a second roller 510) disposed adjacent one another. In some example embodiments, the first roller 505 and the second roller 510 are disposed on top of each other, as shown in FIG. 5a. Further, each of the two rollers 505, 510 may be controlled individually, by the control system, to engage or disengage a thin body shaped item. For example, the roller gripper unit 504 may be adapted to rotate the first roller 505 in a first direction and rotate the second roller 510 in a second direction opposite to the first direction so as to pinch at least a portion of the thin body shape item, referred hereinafter, as a second item, between the first roller 505 and the second roller 510.

Similarly, the roller gripper unit 504 is adapted to rotate the first roller 505 and the second roller 510 in any direction (for e.g., a release direction that is opposite a gripping direction) of the second item so as to release the portion of the second item. Thus, the two rollers 505 and 510 may rotate in directions opposite to each other to pinch and hold at least a portion of the second item between the two rollers 505 and 510 for picking the second item 110. For example, in some embodiments, the first roller 505 may rotate in a clockwise direction while the second roller 510 rotates in a counter-clockwise direction to hold and pick a portion of the second item. Further, each of the two rollers 505 and 510, may rotate in a direction so as to release the second item held by the roller gripper unit 504 of the end effector 502. For example, for placing the item 110 onto a conveyor, both the rollers 505 and 510 may rotate in clockwise or counterclockwise direction to release the portion of the item 110 held between the rollers 505 and 510, and thus, to release the item 110 from the roller gripper 500.

Figure 5B:
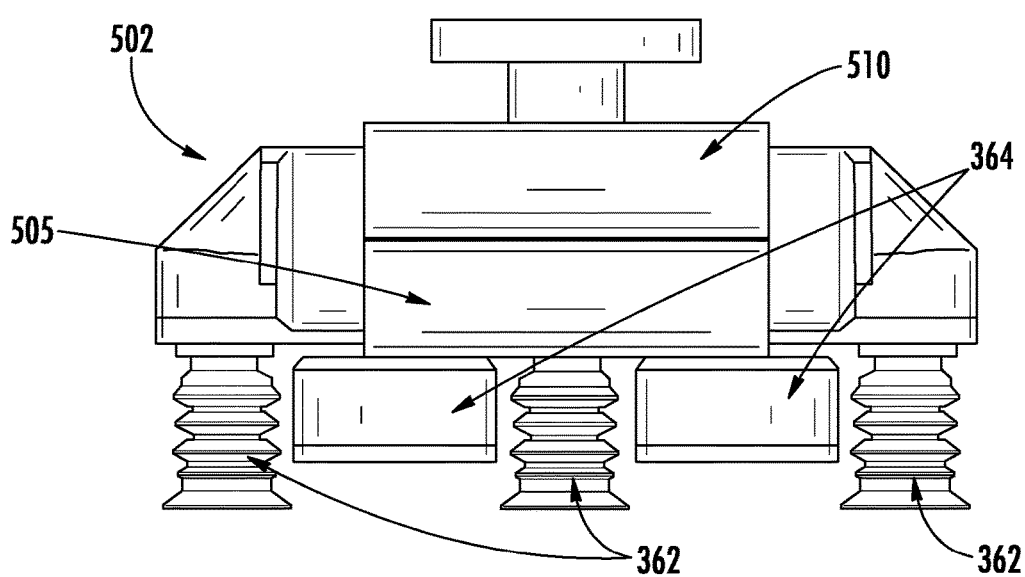
FIG. 5b illustrates a side view of the end effector of FIG. 5a, in accordance with some example embodiments described herein.
Figure 5C:
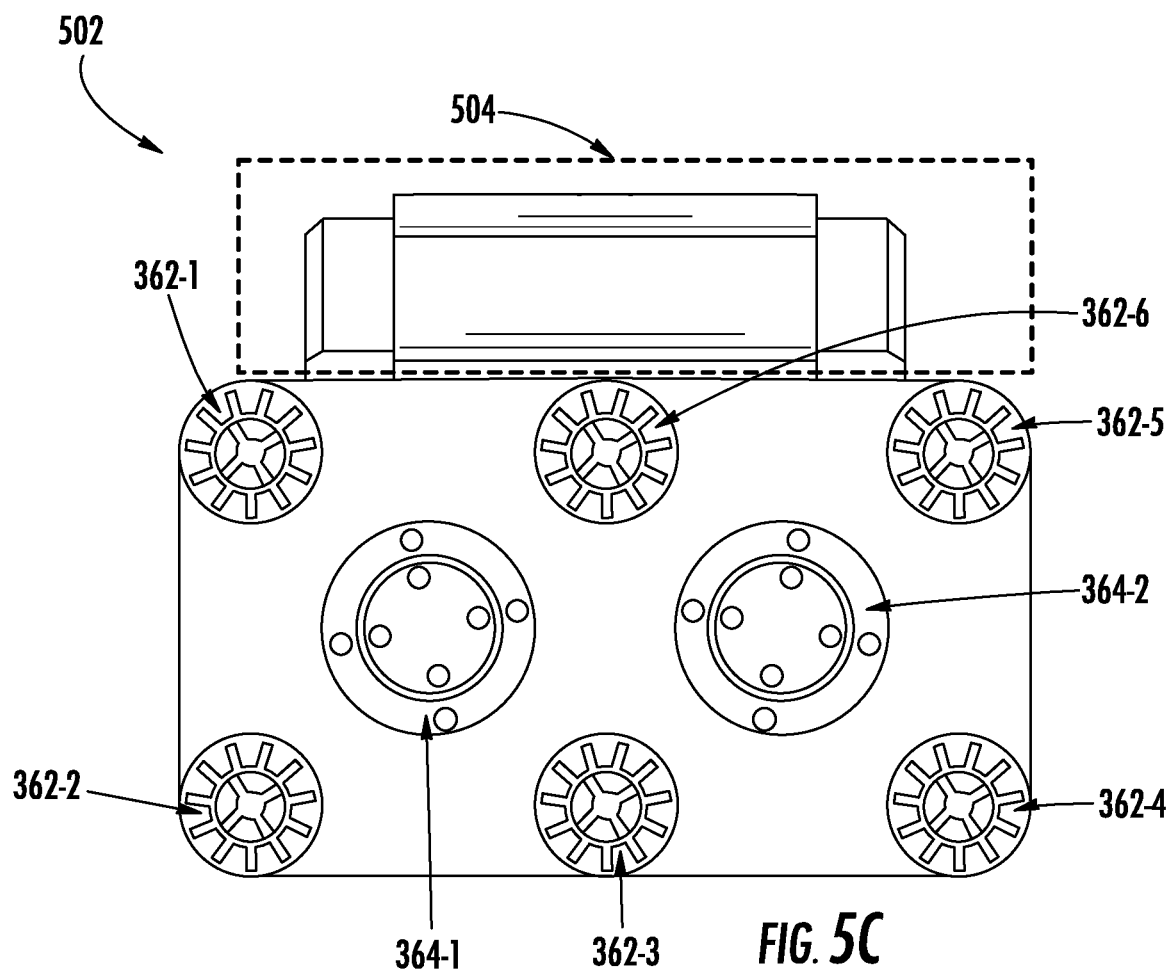
FIG. 5c illustrates a bottom view of the end effector of FIGS. 5a-5b, in accordance with some example embodiments described herein.

FIG. 5b, illustrates a side view of the end effector 502 of the item manipulation system 102, in accordance with some example embodiments described herein. The side view illustrated in FIG. 5b depicts the roller gripper unit 504 having the first roller 505 and the second roller 510 and the at least one flexible suction cups 362 and the at least one rigid gripper 364 of the end effector 502. FIG. 5c illustrates a bottom view of the end effector 502 of the item manipulation system 102, comprising the roller gripper unit 504 and a configuration of gripper unit having six flexible suction cups (e.g., 362-1, 362-2, 362-3, 362-4, 362-5, and 362-6) similar to the at least one flexible suction cup 362 and two rigid grippers (e.g., 364-1 and 364-1) similar to the at least one rigid gripper 364 positioned on a bottom surface of the end effector 502. Referring to the end effector 502 illustrated in FIGS. 5a-5c, the end effector 502 may be adapted to selectively actuate a blower system, including one or more vacuum generators, to actuate and cause generation of vacuum suction force through the at least one flexible suction cups 362 and/or the at least one rigid gripper 364 to engage and hold items of different body shapes.

According to various example embodiments described herein, to cause manipulation of the item 110 from the first orientation to the second orientation, an identification of an item, its position, and its current orientation may be performed based on processing sensor data. The sensor data may be collected by one or more sensors for example, sensors of the vision system 115 and/or the at least one sensor 410 of the robot flange adapter 405. The sensor data may be accessed by the control system of the material handling system 100 and processed to identify the requirement of item manipulation.

In some example embodiments, the vision system 115 may include one or more cameras installed around an area of a material handling environment in which the item 110 is located. The one or more cameras may feed image data to the controller which may analyze the images at a high rate to identify a position and/or an orientation of the item 110 within the material handling environment and/or a label of the item 110. Additionally, and/or alternatively, the sensors of the at least one sensor 410 of the end effector 106 may determine various characteristics of the item 110 including a size, weight, type, and/or the like of the item 110. These characteristics may be utilized to determine an item manipulation strategy of the end effector (106, 502). For example, sensor data generated by the at least one sensor 410, including sensors (e.g., a laser sensor, force sensor, torque sensor, and/or the like) that may be utilized to identify a type of item 110, body shape of the item 110, or other characteristics of the item 110. The control system of the item manipulation system 102 may make an initial assessment of a product type based on determined characteristics of the item and accordingly select an item handling procedure suited for successful handling of the item 110. The initial assessment, for example, may include the identification of the product type, product size, or the like and may be based on the sensor data and/or image data collected at the time of picking and throughout the handling process.

Figure 6:
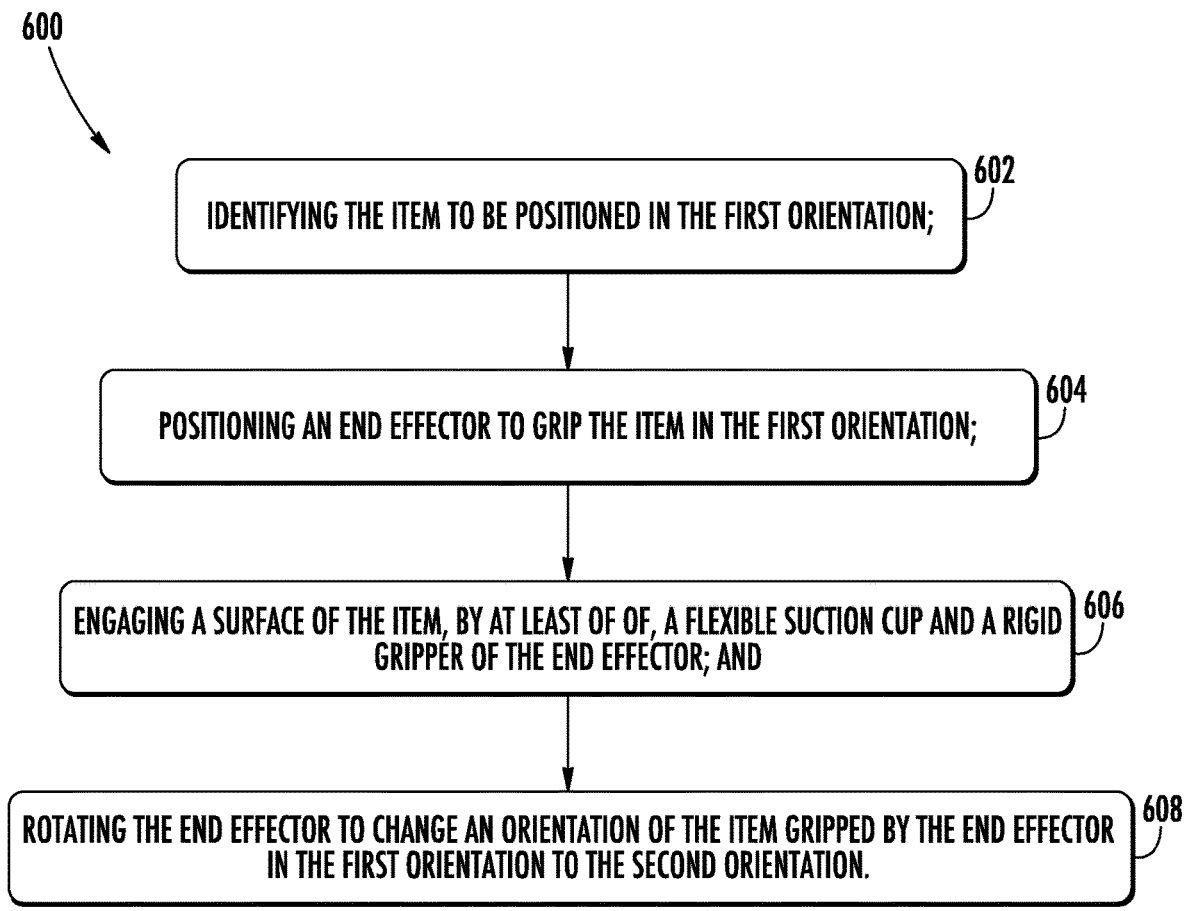
FIG. 6 illustrates a flowchart representing a method of manipulating an item by the item manipulation system, in accordance with some example embodiments described herein.

In some example embodiments, the vision system 115 and/or the controller may also apply machine learning to build a trainable model based on classification of the items to be picked into different categories prior to picking of the item and/or during the item picking. The controller may accordingly adjust an item manipulation strategy of the item manipulation system 102, for example, a picking strategy for picking the item 110. Further, the controller may also determine for the item manipulation system 102 further actions to be performed, upon picking the item by using feedback from one or more sensors (e.g., a force, torque, and/or vacuum sensor). FIG. 6 illustrates an example flowchart of an operation performed by the item manipulation system 102 including the robotic arm portion 305 and the end effector (106, 502) as described in FIGS. 1-5c, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6 when executed, convert a computer or processing circuitry into a particular machine configured to perform an example embodiment of the present invention. Accordingly, the operations of FIG. 6 define an algorithm for configuring a computer or processor, to perform an example embodiment. In some cases, a general purpose computer may be provided with an instance of the processor which performs the algorithm of FIG. 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 6 illustrates a flowchart describing a method 600 for manipulating an item from a first orientation to a second orientation in a material handling environment by the item manipulation system 102, as described in reference to FIGS. 1-5c, respectively.

According to various example embodiments, at step 602, the item manipulation system 102 may include means such as the control system configured to cause identification of the item 110 in a first orientation. As described above, in some example embodiments, the control system may process sensor data accessed from one or more sensors of the vision system 115 and/or one or more sensors of the at least one sensor 410 of the end effector 106 itself. The sensor data may be accessed to identify an orientation and/or one or more characteristics like, but not limited to, body shape of the item, type of the item, weight of the item, center of gravity, etc. of the item 110.

In some example embodiments, the control system may identify the item 110 in the first orientation, via a laser range finder 366 of the end effector 106, as described in reference to FIGS. 3a-3e. In some example embodiments, the laser range finder 366 may communicate to the control system a distance at which the item 110 is positioned relative to the gripper unit 360. Based on the identified orientation of the item 110 and the distance, the control system may determine at least one of the picking position, the gripping position, the retrieval position, or the discharging position of the end effector 106 to which the robotic arm portion 305 and the end effector 106 may be moved.

Upon identifying the item 110 in the first orientation, at step 604, the control system of the item manipulation system 102, may cause movement of the robotic arm 104 to position the end effector (106, 502) so as to pick the item 110 in the first orientation. To pick the item 110 in the first orientation, the robotic arm 104 may move so as to manipulate the robotic arm portion 305 of the end effector 106. This may result in positioning the gripper unit 360 at a position that allows engagement of the item 110 with the gripper unit 360 in the first orientation.

At step 606, upon positioning the gripper unit 360, the gripper unit 360 of the end effector (106, 502) may cause engagement of a surface of the item 110, by at least one of, the at least one flexible suction cup 362 and the at least one rigid gripper 364 of the end effector 106. The control system may cause selective actuation of one or more vacuum generators of the at least one flexible suction cup 362 and the at least one rigid gripper 364 of the gripping unit 360 to engage the item. For example, when the item 110 is identified to be of a flexible body shape, the control system may cause actuation of vacuum generators to generate vacuum suction force through the at least one flexible suction cup 362 to engage a surface of the item 110 with the at least one flexible suction cup 362. In some other cases, when the item 110 is identified to be of a rigid body shape, the control system may cause actuation of vacuum generators to generate vacuum suction force through the at least one rigid gripper 364 to engage a surface of the item 110 with the at least one rigid gripper 364. Alternatively and/or additionally, in some cases, for instance, wherein additional engagement support is required (e.g., a heavy weight or large item) the control system may cause actuation of the vacuum generators to generate a first vacuum suction force through the at least one flexible suction cup 362 and a second vacuum suction force through the at least one rigid gripper 364 to engage with a surface of the item 110 based on vacuum suction force through both of the at least one flexible suction cup 362 and the at least one rigid gripper 364.

In some example embodiments, the control system may cause generation of different vacuum suction forces through each of the at least one flexible suction cup 362 and/or the at least one rigid gripper 364. For example, in some cases, based on determination of center of gravity of the item 110, and/or other characteristics, by the at least one sensor 410 of the end effector 106, different vacuum forces may be generated through each of the at least one flexible suction cup 362 and/or the at least one rigid gripper 364. For example, referring to FIG. 5c, where the end effector 502 defines six flexible suction cups and two rigid grippers, the control system may cause to generate different vacuum suction forces, through each of one or more of the six flexible suction cups and/or the two rigid grippers, respectively.

Upon engaging the item 110, at step 608, the item manipulation system 102 may include means such as, the robotic arm portion 305 of the end effector 106, to cause rotation of the end effector 106, to change an orientation of the item 110 engaged to the gripper unit 360 in the first orientation to a second orientation. In this aspect, the second orientation is different than the first orientation. In some examples, the robotic arm portion 305 of the end effector 106 may rotate by 90 degrees about its axis, so as to manipulate the item 110 gripped on the gripper unit 360 in the first orientation, to the second orientation. In some examples, the robotic arm portion 305 of the end effector 106 may rotate by 180 degrees about its axis, so as to manipulate the item 110 gripped on the gripper unit 360.

According to some example embodiments, at step 604, the control system may cause, via the robotic arm portion 205, movement of the end effector 106 to a first position to pick the item 110 in the first orientation. Upon picking the item 110, and rotating the end effector 106, as described in step 608, the control system may further cause, via the robotic arm portion 205, movement of the end effector 106 to a second position so as to place the item in the second orientation. In some examples, the first position may correspond to a position on the chute 125 and the second position may correspond to a position on the conveyor 130. Thus, in operation, the robotic arm portion 305 may move to pick the item 110 in the first orientation from the chute 125 and upon rotation of the gripper unit 360, place the item 110 on the conveyor 130 in the second orientation. Furthermore, upon placing the item in the second orientation, the control system may cause, via the ejectors, ejection of the item 110 gripped by the end effector 106.

According to some example embodiments, at step 606, to engage the surface of the item 110, by at least one of the at least one suction cup 362 and/or the at least one rigid gripper 364, the vision system 115 and/or the at least one sensor 410 of the end effector 106 may generate sensor data corresponding to at least one of: a weight distribution of the item, or a center of gravity of the item. Further, the control system may process the sensor data to identify a desired vacuum suction force to be generated by a vacuum generator of the end effector 106 through each of the at least one flexible suction cup 362 and/or the at least one rigid gripper 364, respectively.

Thus, items of different body shapes and characteristics such as, but not limited to, size, weight, center of gravity, etc. can be handled by the item manipulation system 102 in accordance with various example embodiments described herein.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An item manipulation system comprising:
    a control system;
    a robotic arm communicatively coupled to the control system;
    an end effector communicatively coupled to the control system, wherein the end effector defines a first end rotatably engaged to the robotic arm and a second end;
    a gripper unit attached at the second end of the end effector and configured to be actuated by the control system so as to grip an item, the gripper unit comprising:
        at least one flexible suction cup; and
        at least one rigid gripper, wherein each of the at least one flexible suction cup and the at least one rigid gripper are configured to engage a surface of the item based on vacuum suction force generated through the at least one flexible suction cup and the at least one rigid gripper.

2. The item manipulation system of claim 1, wherein the robotic arm is adapted to rotate the end effector so as to change an orientation of the item gripped by the gripper unit from a first orientation to a second orientation.

3. The item manipulation system of claim 1, wherein the gripper unit further comprises at least one ejector positioned at each of the at least one flexible suction cup and the at least one rigid gripper, wherein the at least one ejector is adapted to eject the item gripped by the gripper unit.

4. The item manipulation system of claim 1, wherein the robotic arm is adapted to position the end effector so as to:
    pick the item positioned in a first orientation by gripping the item with the gripper unit; and
    move the end effector in order to place the item in a second orientation.

5. The item manipulation system of claim 1, further comprising at least one vacuum generator adapted to generate the vacuum suction force through the at least one flexible suction cup and the at least one rigid gripper to facilitate gripping of the item by the gripper unit.

6. The item manipulation system of claim 1, further comprising a laser range finder adapted to:
    identify the item in a first orientation; and
    communicate to the control system at least one of a picking position, a gripping position, a retrieval position, or a discharging position of the end effector based on the identified first orientation.

7. The item manipulation system of claim 1, wherein the end effector further comprises:
    a roller gripper unit comprising:
        a first roller; and
        a second roller,
    wherein the roller gripper unit is adapted to:
        rotate the first roller in a first direction and rotate the second roller in a second direction opposite to the first direction so as to pinch at least a portion of a second item between the first roller and the second roller; and
        rotate the first roller and the second roller in any direction so as to release the portion of the second item.

8. The item manipulation system of claim 1, further comprising an adapter unit configured to rotatably engage one end of the robotic arm to the first end of the end effector, the adapter unit comprising at least one sensor configured to:
    generate sensor data corresponding to at least one of a weight distribution of the item or a center of gravity of the item; and
    process the sensor data in order to identify a vacuum suction force to be generated by a vacuum generator of the end effector.

9. The item manipulation system of claim 1, wherein the flexible suction cup is adapted to engage a flexible item based on a vacuum suction force generated in the flexible suction cup, and wherein the rigid gripper is adapted to engage a rigid item based on a vacuum suction force generated in the rigid gripper.

10. An end effector comprising:
    a first end configured to be rotatably engaged to an end of a robotic tool;
    a second end comprising: a rigid gripper and a flexible suction cup, wherein each of the rigid gripper and the flexible suction cup is configured to engage a surface of an item based on vacuum suction force generated by a vacuum generator, through the rigid gripper and the flexible suction cup; and
    wherein, in response to an actuation by the robotic tool, the end effector is configured to rotate about an axis so as to change an orientation of the item engaged at the second end from a first orientation to a second orientation.

11. The end effector of claim 10, further comprising a laser range finder adapted to identify an orientation of the item, wherein the end effector is further configured to move to one of a picking position, a gripping position, a retrieval position, or a discharging position based on the identified orientation of the item.

12. The end effector of claim 11, wherein the end effector is moved to the gripping position to grip the item and further rotated to change the orientation of the item from a first orientation to a second orientation.

13. The end effector of claim 10, further comprising a roller gripper unit comprising:
    a first roller; and
    a second roller, wherein the roller gripper unit is adapted to:
rotate the first roller in a first direction and rotate the second roller in a second direction opposite to the first direction so as to pinch at least a portion of a second item between the first roller and the second roller; and
rotate the first roller and the second roller in a release direction of the item so as to release the portion of the second item.

14. The end effector of claim 10, wherein the first end of the end effector comprises an adaptor unit configured to rotatably engage with the end of the robotic tool, the adaptor unit comprising at least one sensor configured to:
generate sensor data corresponding to at least one of a weight distribution of the item or a center of gravity of the item; and
process the sensor data in order to identify a vacuum suction force to be generated by a vacuum generator of the end effector.

15. The end effector of claim 10, wherein at the second end of the end effector comprises:
at least four flexible suction cups positioned at each corner of a bottom surface of the end effector; and
the rigid gripper positioned at a center of the bottom surface of the end effector.

16. The end effector of claim 10, further comprising at least one ejector at each of the flexible suction cup and the rigid gripper, wherein the at least one ejector configured to eject the item gripped by the end effector.

17. A method of manipulating an item comprising:
identifying the item positioned in a first orientation;
positioning an end effector to pick the item in the first orientation;
engaging a surface of the item via at least one flexible suction cup and at least one rigid gripper of the end effector based on vacuum suction force generated through the at least one flexible suction cup and the at least one rigid gripper; and
rotating the end effector to change an orientation of the item engaged to the end effector from the first orientation to a second orientation.

18. The method of claim 17 further comprising:
moving the end effector to a first position to position the end effector to pick the item in the first orientation;
moving the end effector to a second position to position the end effector to place the item in the second orientation; and
ejecting, by ejectors of the flexible suction cup and the rigid gripper, respectively, the item gripped by the end effector.

19. The method of claim 17, further comprising:
generating sensor data corresponding to at least one of a weight distribution of the item or a center of gravity of the item; and
processing the sensor data to identify a vacuum suction force to be generated by a vacuum generator of the end effector through each of the flexible suction cup and the rigid gripper.

20. The method of claim 17 further comprising:
identifying, by a laser range finder of the end effector, an orientation of the item; and
communicating to a control system of the end effector, at least one of a picking position, a gripping position, a retrieval position, or a discharging position of the end effector based on the identified orientation of the item.

* * * * *